Figure 1:
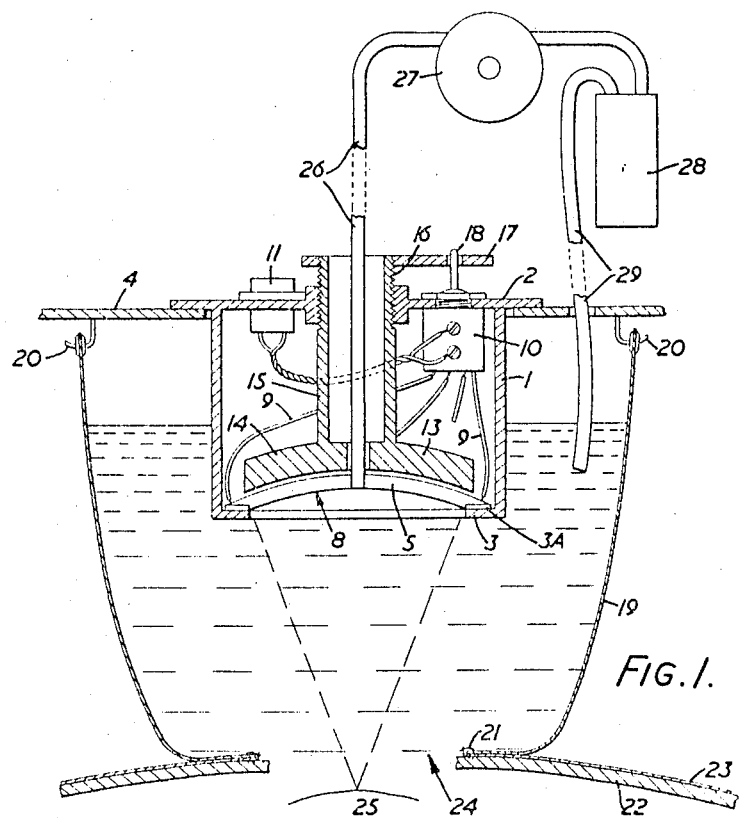

March 1, 1966  G. A. D. GORDON  3,237,623
APPARATUS FOR DESTROYING LIMITED GROUPS OF CELLS
Filed May 1, 1963  3 Sheets-Sheet 1

INVENTOR
George Andrew Douglas Gordon
BY
Baldwin & Wight
ATTORNEYS

INVENTOR
George Andrew Douglas Gordon
BY
Baldwin & Wight
ATTORNEYS

United States Patent Office 3,237,623
Patented Mar. 1, 1966

3,237,623
APPARATUS FOR DESTROYING LIMITED GROUPS OF CELLS
George A. D. Gordon, Friston House, 25 Church Road, Richmond, Surrey, England
Filed May 1, 1963, Ser. No. 277,309
Claims priority, application Great Britain, Feb. 4, 1963, 4,465/63
4 Claims. (Cl. 128—24)

The present invention relates to an apparatus for destroying limited groups of cells. In certain parts of the body, especially the eye and brain, it is necessary to destroy limited groups of cells completely while avoiding damage to cells in close proximity which cannot be sacrificed without loss of important functions.

In the eye it is accepted practice to employ very intense light rays focussed sharply on the cells to be destroyed just as a burning glass concentrates the sun's rays. The location of the focal spot is identified by projecting low intensity light first and observing it with an ophthalmoscope. This technique suffers the disadvantage that any matter that is opaque to light but lies in the light path will prevent the light from reaching its target while it will itself be heated.

In the brain it is usual to identify the shape of the brain of the patient to be treated by special X-ray examination with air or other material demonstrable by X-rays while some landmarks are provided by metal devices firmly attached to the skull. Needles or electrodes are then introduced into the brain and used to produce destruction by thermal or chemical means. The disadvantage of this technique is that the brain floats within the skull and it may alter its position between the X-ray examination and the operation and also the mere introduction of a needle or electrode will push the brain away from the point of entry.

If ultrasound is used as a destroying agent it is necessary to make a much larger opening in the skull and this greatly increases the risk of brain movement relative to the skull.

It is well known that structures within the brain produce echoes with ultrasound when examination is made using techniques similar to those used in flaw-detectors in industry. It is also well known that if a flaw-detector probe is provided with a curved crystal or a lens so that the rays are concentrated at a point then it will detect objects close to the focus much more readily than objects far from the focus.

The invention includes apparatus for destroying limited groups of cells comprising an ultrasonic transducer which can be used to identify the shape of the body to be treated by using very weak ultrasonic energy pulses, and which can then be altered in its electrical and mechanical damping, but not in regard to its focal spot, for delivering to the focal spot to destroy the cells power which is very high relatively to the pulses.

Preferably the apparatus includes a stereotaxic device to permit the ultrasonic transducer to move about its focus in two directions along angular co-ordinates.

The apparatus may also include a second stereotaxic device which can move the first stereotaxic device and the ultrasonic transducer accurately on cartesian co-ordinates relative to the body of the patient on which the apparatus is to be used.

The apparatus also preferably includes a location device to immobilize the appropriate part of the patient which is to be operated upon.

An industrial flaw-detector having a cathode ray screen may be included in the apparatus together with switching means which can act to connect the transducer to the flaw-detector and to an ultrasonic power generator.

If the apparatus is to be used on the eye an ophthalmoscope is preferably included to permit identification of the target area by direct vision.

Preferably means for coupling the ultrasonic transducer to the patient by means of a liquid are included, and the liquid may be saline or a similar liquid.

In a convenient arrangement a transducer is utilised in which the silvering on the outside surface of the crystal is divided into four or more sectors.

The areas of some of the sectors are greater than the others and each of the larger sectors is arranged inbetween a pair of smaller sectors.

With this arrangement a mechanical damper may be included which can move so that in one upper position there is an air gap between the crystal and the damper, and in a lower position the damper bears against the crystal and permits the production of short pulses. Thus the adjacent sections of the silvering on the outer surface of the crystal can be connected in pairs so that one acts as a transmitter and the other as a receiver when the crystal is damped, to act as a flaw-detector.

Similarly the larger sectors may be connected together and used as an active driving electrode, and the damper can be raised to its upward position when the apparatus is used to destroy the cells.

Figure 2:
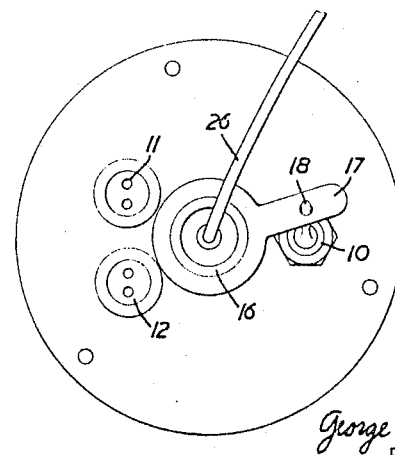
Figure 3:
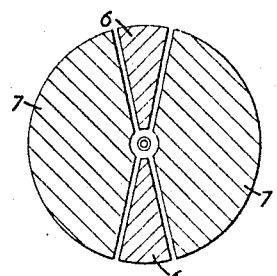
Figure 4:
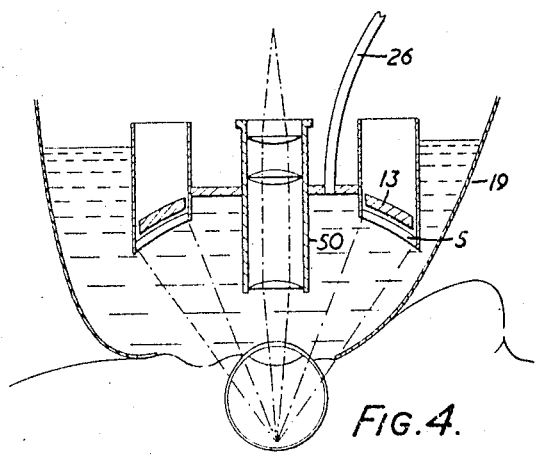
Figure 5:
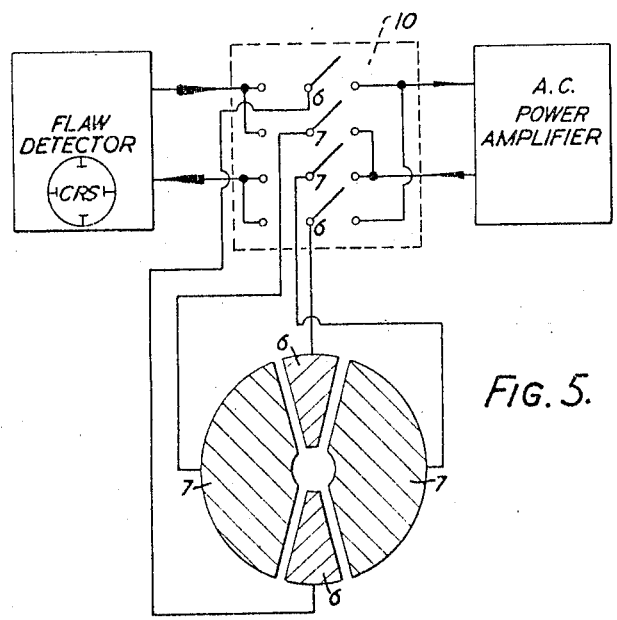

The invention may be performed in various ways but two embodiments will now be described by way of example with reference to the accompanying drawings in which:

FIGURE 1 is a cross sectional diagrammatic view of a transducer for use with the invention, FIGURE 2 is a plan view of the transducer as shown in FIGURE 1, FIGURE 3 is a plan view of the manner of silvering applied to the outside surface of the crystal of the transducer shown in FIGURE 1 and FIGURE 2, FIGURE 4 is a cross sectional diagrammatic view of an alternative form of transducer embodying an opthalmoscope, FIGURE 5 is a circuit diagram showing the manner of connecting the transducer crystal to the flaw-detector and power supply.

Figure 6:
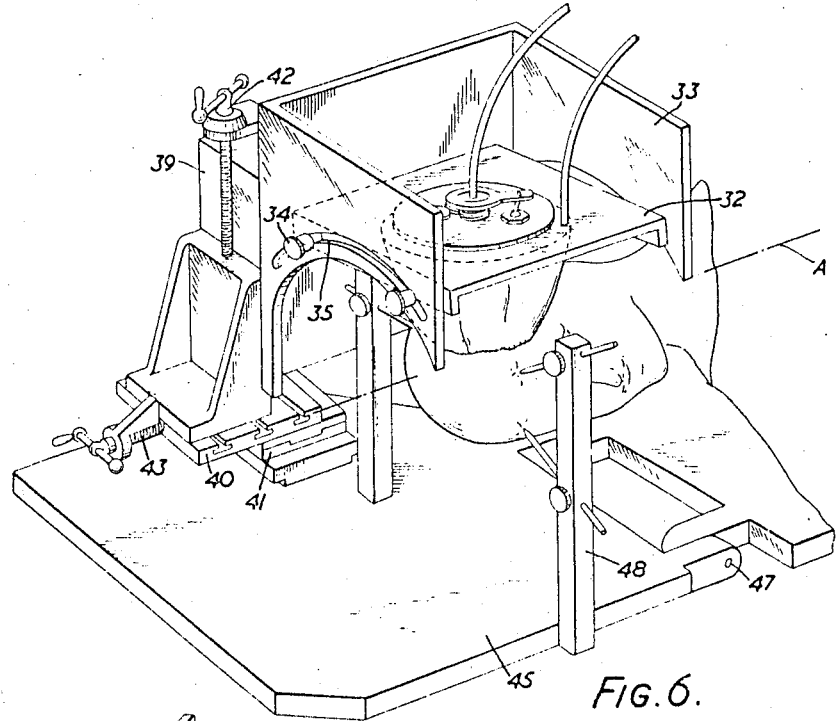
Figure 7:
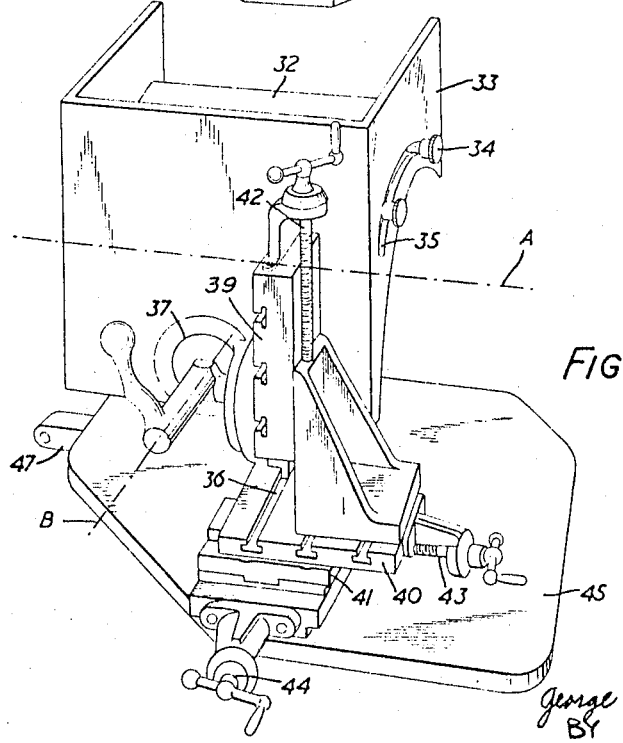

FIGURE 6 and FIGURE 7 are isometric views of a combined stereotaxic device on which the transducer can be mounted, and a location device to prevent the appropriate part of the patient which is to be operated upon from moving. This apparatus comprises an ultrasonic transducer, which is to be described in more detail, and a stereotaxic device to permit the transducer to move about its focus in two directions along angular co-ordinates. A second stereotaxic device is also included that moves the ultrasonic transducer and the first stereotaxic device accurately on Cartesian co-ordinates relative to the patient who is kept in a fixed position by the location device, which immobilizes the appropriate part to be operated upon.

An ultrasonic power generator is also included together with an industrial flaw-detector, for example of the type shown in United States Patent No. 2,467,301. The various units are connected electrically so that a switch can connect the various parts of the transducer to the flaw-detector or to the power generator, and can apply appropriate electrical loading and control mechanical loading on the crystal. If the apparatus is to be used on eyes an opthalmoscope is also include to permit identification of the target area by direct vision and to observe the physical effect of the treatment.

When the transducer is to be used in appartus for application to the brain, any suitable form of focussing ultrasonic transducer can be used, whether based on the concave bowl, the flat plate and lens, or the flat plate and reflectors principle.

The ultrasonic transducer to be described has an electrically energizable crystal generator, the output of which is transmitted through a cooling liquid to the zone of application. The output face of the crystal is in contact with the cooling liquid through which the output is to be transmitted, and the crystal is carried by a support to an acoustic transmission damping means. The outer face of the crystal has an upper face which is silvered over partial zones, and a lower face which is silvered over its whole area, the various silvered zones being connected to appropriate contacts. Thus referring, firstly, to FIGURE 1, FIGURE 2 and FIGURE 3 the reference 1 indicates a hollow head having top 2 and an inturned flange 3, the head being located against a seating 4.

The flange 3 has mounted on it but separated by a neoprene spacer ring 3A a ceramic crystal 5, in the shape of a bowl, the upper face of which is silvered over zones 6, 7 divided in the manner indicated in FIGURE 3 and the lower face is silvered as indicated at 8 over its whole area.

Arranged above the crystal is a damper 13 which comprises a curved damping plate 14 supported on the end of a tubular column 15. The upper end of the column 15 carries a screw thread 16 which engages a cooperating screw thread provided at an aperture in the top 2. The upper extremity of the screw thread 16 carries an operating lever 17 which is formed with a locating hole 18 in which the operating lever of the switch 10 is located. The screw thread 16 is of quick pitch, so that movement of the lever 17 to "throw" the switch 10 provides sufficient rotational movement to cause the damper to move down and engage the upper surface of the crystal. In the upper position there is an air gap between the crystal 5 and the damper 13 so that the latter has no effect, and in the lower position the damper presses on the crystal and permits the production of short pulses.

A skin 19 of nylon or similar material is arranged to be attached to the seating 4 by hooks 20, and the lower edges 21 of this skin are stitched or stuck to the scalp of the patient when the apparatus is to be used for a brain operation. The skull of the patient which is to be operated upon is shown at 22 and the scalp at 23. The skull 22 is cut away to provide an aperture as shown at 24 to obtain access to the brain shown at 25.

Liquid in the form of a saline solution is introduced to the bath provided by the skin 19 by means of a pipe line 26 which passes down the center of the damper 13 and crystal 5. Saline solution is pumped into the bath by a circulating pump 27 and the liquid is withdrawn to a heat exchanger 28 by means of a return pipe 29. Thus it will be seen that the pump provides saline solution to the bath at a temperature which is controlled by the heat exchanger. With this arrangement the output of the crystal is directed through the saline solution to the part to be operated upon and the re-circulation of the saline solution prevents the generation of dangerous heat. In this way of life of the ceramic crystal is ensured and its fracture from being overheated is avoided.

An industrial flaw-detector of known type can be plugged into the socket 12 and an A.C. power amplifier, also of known type, can be connected to the transducer via the socket 11.

The switch 10 for connecting the sectors of the transducer to the A.C. power amplifier and to the flaw-detector is shown diagrammatically in FIGURE 5. When the apparatus is to work as a flaw-detector the adjacent sectors of the silvering are connected in pairs, one pair acting as a transmitter and the other as receiver, the crystal being damped by the damper 13. When the apparatus is used to destroy tissue the large sectors 7 are connected together and used as the active driving electrode. The two small sectors 6 are also connected together and used as the feed back and phase-monitoring silvering to control the frequency and power, which may be done in a known manner. The switch is arranged so that when the amplifier is selected the damper is removed from the crystal to avoid waste of power.

FIGURES 6 and 7 show a combined stereotaxic device comprising a support platform 32 on which the transducer apparatus can be mounted. The platform is carried in support cradle 33 by adjustable lock studs 34 which can move in arcuate slots 35 provided in the side walls of the cradle. The slots 35 are radiused about an axis A which passes through the focus of the transducer when it is in position. The support cradle 33 is connected to a support device 36 through a pivotable connection 37, the axis B of which also passes through the focus of the transducer when it is in position. Thus the transducer can move about its focus in two directions along angular co-ordinates, and the cradle provides the first stereotaxic device referred to.

The second stereotaxic device, which is combined with the first in the apparatus being described is provided by the support device 36. This comprises three movable slides 39, 40, 41. The slide 39 carries the pivotable connection 37, the slide 40 carries the slide 39, and the slide 41 carries the slide 40. The direction of movement of each of the slides is along an axis normal to the other two so that accurate three dimensional movement of the connection 37 is possible on cartesian co-ordinates. The slides are operated by respective lead screws 42, 43 and 44, and slide 41 is carried by a base platform 45, by which the combined stereotaxic device is supported.

The base platform 45 is pivotally connected to a support table by hinges 47 so that it can be moved to accommodate the patient and also provided on the base platform 45 is a location device in the form of means 48 of known type for accurately and firmly retaining in fixed position the part of the patient to be operated upon, so that the transducer can be moved relatively thereto by the stereotaxic devices.

When the ultrasonic transducer is for use with operations on the eye, the central aperture in the crystal bowl 5 has to be very much larger, so that none of the ultrasound may pass through the crystalline lens of the eye as the lens may be damaged, and in any case would prevent the correct focussing of the ultrasound. In the arrangement shown in FIGURE 4 the large central aperture also provides ample space for an ophthalmoscope 50 to be mounted. This ophthalmoscope is preferably of the conventional type except for the modifications introduced by the fact that the light travels through water instead of air for part of the distance. Suitable corrections have therefore to be provided for the refraction of cornea and lens when the target is far from the axis of the lens. In this arrangement the tube 26 is offset as shown. For convenience the operating and supporting apparatus as shown in FIGURES 1, 6 and 7 is omitted from FIGURE 4.

The operation of the apparatus is as follows. The transducer is supported by the combined stereotaxic device over a patient fixed in position by the location device 48. The transducer is coupled acoustically to the patient by saline or similar liquid at body temperature, the liquid being selected as having the same sound velocity as the tissues. The transducer is connected by the switch 10 to the industrial flaw-detector which is adjusted so that echoes from an object at the focus of the transducer are displayed at a marked point on the cathode ray screen of the flaw-detector. The approximate shape of the part to be treated having been discovered, the transducer is tilted by the first stereotaxic device so that the axis of the transducer is perpendicular to the assumed plane of the surface to be identified.

The transducer is now moved by the second stereotaxic device so that the focus is approximately at the site of the surface of the brain or eye that is to be identified, which should then produce an echo signal on the screen of the flaw-detector. By careful adjustment of the second stereotaxic device the position of the point on the surface can be charted by taking readings on graduated measurement bars when the echo signal is seen to be exactly at the marked point on the screen of the flaw-detector. The transducer is now tilted by the first stereotaxic device to obtain the largest possible signal which indicates the position when the probe axis is perpendicular to the surface being examined.

By repeating the procedure at a multiplicity of points the whole of the extent and angulation of the surface can be mapped out as a series of co-ordinate readings in three planes.

When all the information has been obtained for all the surfaces within the part in consideration, a complete three dimensional record identifying its shape will have been obtained using ultrasonic energy at a very low intensity incapable of causing damage. From this it is possible to decide the co-ordinates of the target tissues and to decide how the series of roughly egg-shaped areas of destruction should be placed to destroy the whole target.

The transducer is now moved by the second stereotaxic device so that its focus is at the first target area. The switch is altered to the irradiation position, removing the damping on the crystal and connecting the transducer to the A.C. amplifier. This procedure is repeated for as many sites as is necessary to destroy the whole target. If the target is in the brain and the patient is under local anaesthesia the effect is controlled by clinical and physiological examination and testing.

In the case of the eye, as the geometry is that of an almost perfect sphere it is not possible to establish the target area by ultrasound alone, unless the disease has caused a local thickening that can be identified. In this case the ultrasonic technique, as set forth above detects and identifies the distance to the inner surface of the wall of the eye and the corresponding distance to the outer surface. The exact point on the inner surface below which the tissues are to be destroyed can however be identified by the ophthalmoscope mentioned above. The ophthalmoscope is adjusted to have the center of its field marked and exactly aligned to the focus of the bowl of the transducer. It is thus possible to identify the target area visually and to observe the effect of irradiation.

The precise details of the transducer to be used will differ considerably according to whether it is intended for the brain or some other portion of the anatomy, or the eye. It is for example possible to apply the same technique to the spinal cord and peripheral nerves and to some other tissues.

I claim:

1. Apparatus for destroying limited groups of cells comprising an ultrasonic transducer which includes a crystal having silvered inner and outer surfaces, the silvering on the outer surface of the crystal being divided into at least four sectors; means, including a movable mechanical damper, for applying variable electrical and mechanical damping to said transducer; liquid means for coupling said ultrasonic transducer to a patient; means selectively connected to said transducer for identifying the shape of a body to be treated with short, weak pulses of ultrasonic energy; means for altering the electrical and mechanical damping of said transducer while retaining the same predetermined focal spot, the latter means including means for moving said mechanical damper between an upper position in which there is an air gap between the crystal and the mechanical damper and a lower position in which the mechanical damper bears against the crystal to permit the production of the short pulses of ultrasonic energy; and means selectively connected to said transducer for delivering ultrasonic energy which is very high relatively to said pulses to said predetermined focal spot to destroy said cells.

2. Apparatus as claimed in claim 1, and further comprising means for connecting adjacent sectors of the silvering on the outer surface of the crystal so that one pair acts as a transmitter and the other pair acts as a receiver when the crystal is damped by the mechanical damper in its lower position.

3. Apparatus as claimed in claim 1, in which the areas of some of the sectors are greater than the areas of the others, each of the larger sectors being arranged between a pair of the smaller sectors, said apparatus further comprising means for connecting the larger sectors together to act as an active driving electrode when the mechanical damper is raised to its upper position and high power is delivered to said focal spot to destroy the cells.

4. Apparatus for destroying limited groups of cells comprising an ultrasonic transducer having a predetermined focal spot; means for applying variable electrical and mechanical damping to said transducer; flaw-detector means selectively connected to said transducer for identifying the precise shape of a body to be treated with very weak echo pulses of ultrasonic energy; means for altering the electrical and mechanical damping applied to said transducer while retaining the same predetermined focal spot; power generating means selectively connected to said transducer for delivering ultrasonic energy which is very high, relatively to said shape identifying pulses, to said predetermined focal spot to destroy said cells; and an ophthalmoscope to permit identification of the target area by direct vision.

References Cited by the Examiner

UNITED STATES PATENTS 2,559,227 7/1951 Rieber.
3,117,571 1/1964 Fry et al. _____ 128—24

OTHER REFERENCES

Fry et al.: "Proceedings of the Third International Conference on Medical Electronics," pages 453–457, July 26, 1960.

Mundt et al.: "American Journal of Ophthalmology," vol. 41, No. 3, pp. 488–491, March 1956.

RICHARD A. GAUDET, *Primary Examiner.*

W. E. KAMM, *Assistant Examiner.*